Figure 1:
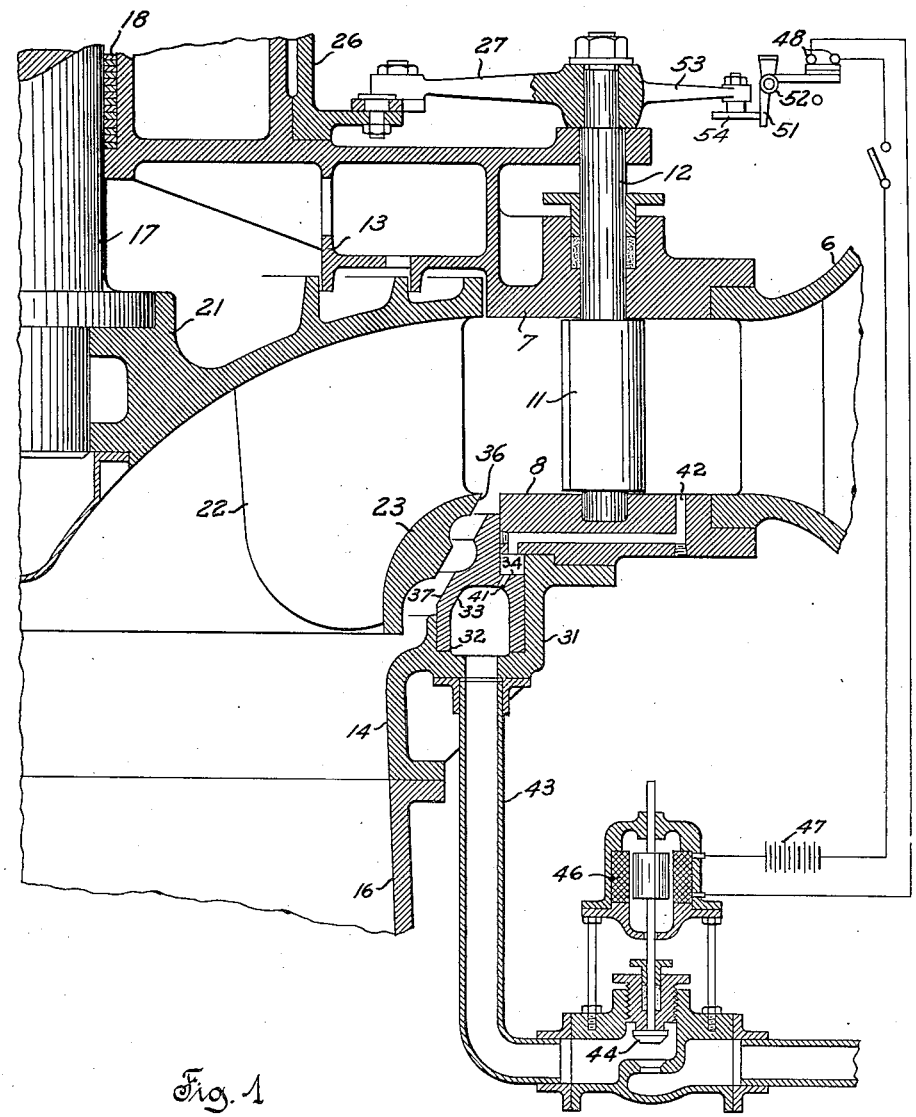

Sept. 22, 1936.                A. PFAU                 2,055,134
                          HYDRAULIC TURBINE
                    Filed Dec. 8, 1934      3 Sheets-Sheet 1

Inventor
A. Pfau
by G. F. Elbin
Attorney

Sept. 22, 1936.        A. PFAU        2,055,134
HYDRAULIC TURBINE
Filed Dec. 8, 1934        3 Sheets-Sheet 2

Patented Sept. 22, 1936

2,055,134

UNITED STATES PATENT OFFICE 2,055,134

HYDRAULIC TURBINE

Arnold Pfau, Milwaukee, Wis., assignor to Allis-Chalmers Manufacturing Company, Milwaukee, Wis., a corporation of Delaware Application December 8, 1934, Serial No. 756,640

14 Claims. (Cl. 253—117)

This invention relates to improvements in hydraulic turbine construction and more particularly to means for bypassing leakage around a turbine rotor upon closure of the gate means controlling the supply of water to the turbine rotor and for bypassing the full flow through the gate, around the turbine rotor, upon occurrence of large and sudden load changes.

It is frequently desired to operate a generator, normally driven by a hydraulic turbine, as a motor for the purpose of utilizing the inductive capacity of the generator to improve the power factor of the electric distribution line. When the generator is so used as a synchronous condenser, only wattless power should be drawn from the line. The work to be done by the motoring generator should therefore be minimized and should be limited to overcoming friction and windage in the generator and the turbine. The gate controlling the supply of water to the turbine rotor should therefore be closed as tightly as possible but even such tight closure, in the present gate constructions, is not sufficient to prevent such amount of leakage therethrough as suffices to accumulate a mass of water in the turbine rotor. Such mass of water is then carried around in the rotor and greatly increases the load thereon which reduces the effectiveness of the generator acting as a synchronous condenser.

Another problem encountered in the operation of hydraulic turbines and particularly in turbines of the reaction type, is the problem of securing sufficiently rapid response of turbine operation to changes in load and particularly to load decreases. It is impractical and even dangerous to attempt to decelerate the flow of water quickly enough to have any effect when the load decreases largely and suddenly. Means must therefore be provided to bypass the full flow of water through the gate, around the turbine, immediately upon the occurrence of load decreases and such action, to be effective, must take place even before the gate means have begun to have a throttling effect on the flow. Thus the bypassing means must be quick acting whereas the shutoff means or gate should be relatively slow acting. The bypass should, of course, return to its initial or ineffective position immediately upon complete closure of the gate.

Both of the problems above indicated can be solved by means which are generally similar and which operate in a similar manner. To attain the desired result, it is however necessary that such means differ in degree as to construction and operation in order that each of the above functions may be most effectively performed.

It is therefore an object of the present invention to provide means permitting the bypassing of the flow of water, through the gate of a hydraulic turbine, around the rotor of the turbine.

Another object of the invention is to provide means movable into position to bypass either the whole or a part of the flow of water into a hydraulic turbine, around the rotor thereof.

Another object of the present invention is to provide means associated with hydraulic turbines to minimize unavoidable leakage into the rotor of the turbine when in operation and to prevent the action of such leakage on the rotor when the turbine is not producing power.

Another object of the invention is to provide means controlled by the gate of the turbine to provide a bypass around the turbine operable immediately and opening fully upon closure of the gate and so arranged as to accommodate the full flow.

Another object of the invention is to provide means operable by the pressure from the source of water supplied to a hydraulic turbine and controlled by the gate regulating such supply to control the path of water flowing through the turbine.

Another object of the invention is to provide a hydraulic turbine structure with means for bypassing the leakage through the water shutoff gate upon closure thereof to avoid action of the rotor upon such leakage.

Figure 2:
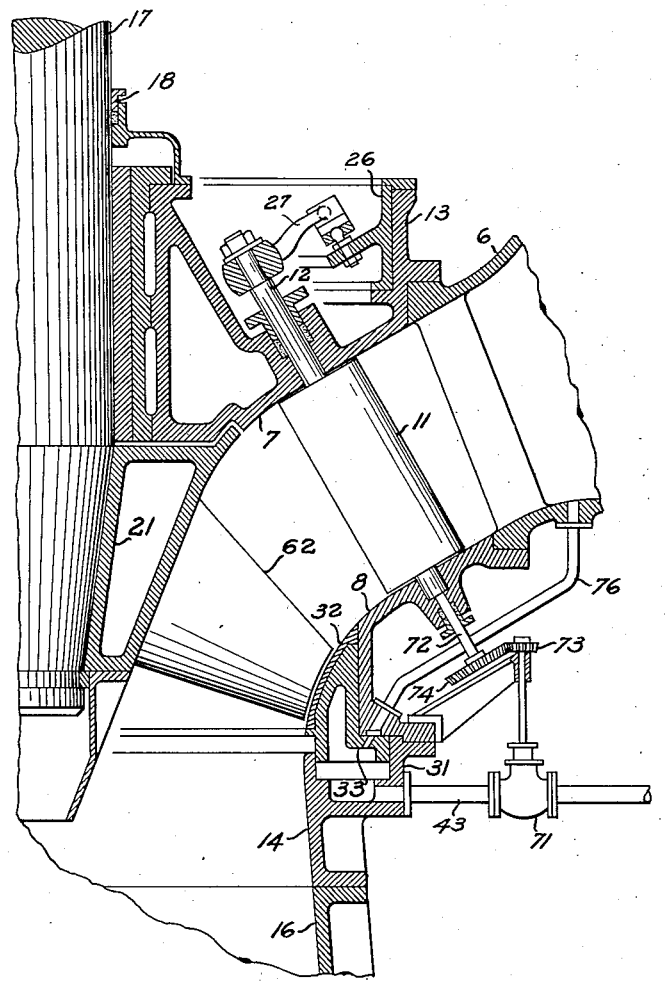
Figure 3:
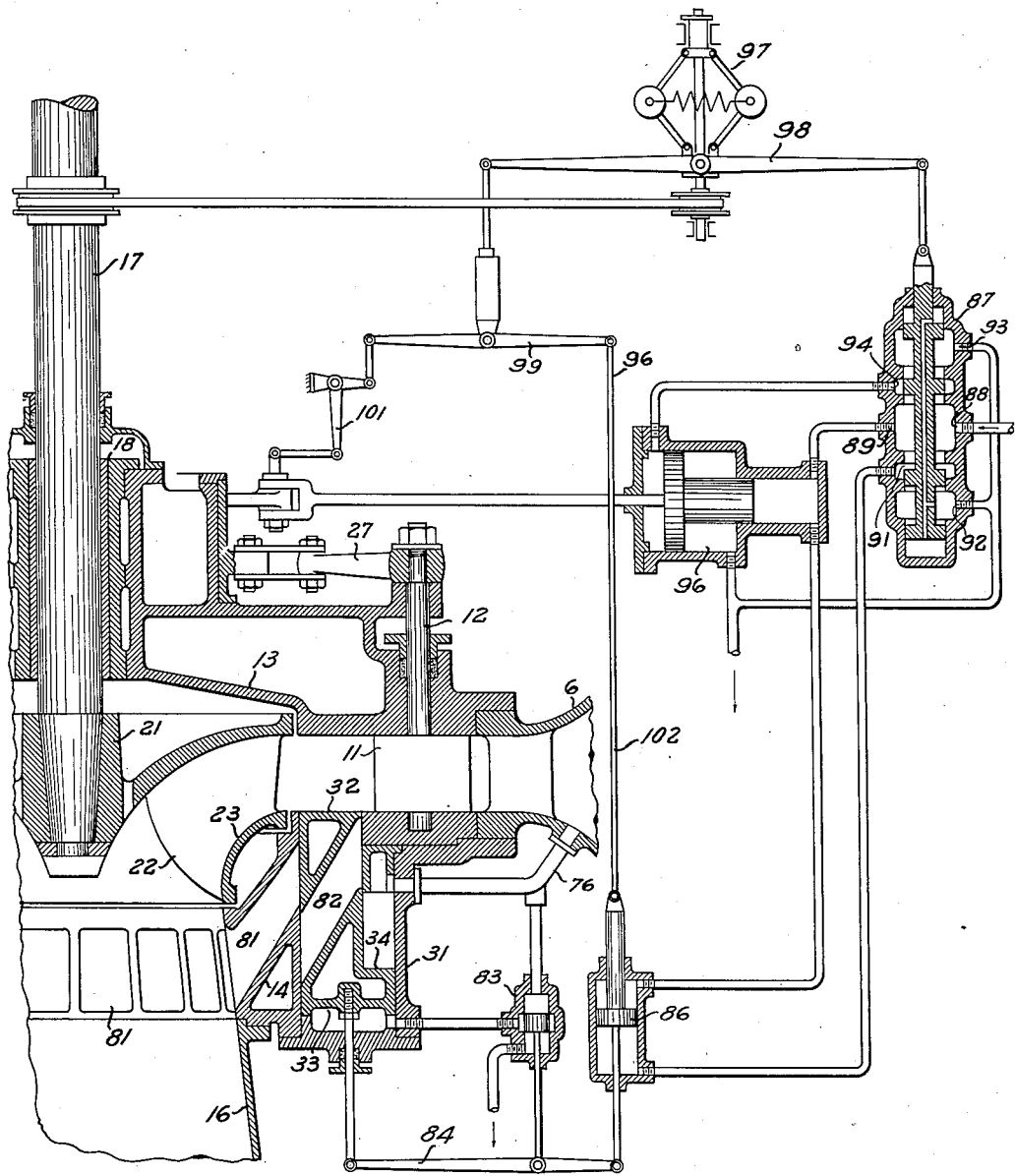

Objects and advantages other than those above set forth will be apparent from the following description when read in connection with the accompanying drawings in which:

Fig. 1 is a partial vertical sectional view of a hydraulic turbine of the reaction or Francis type illustrating one embodiment of the invention applied to the usual form of reaction turbine operating within a guide case for radially directing the flow of water into the turbine;

Fig. 2 is a partial vertical sectional view of a modified form of the invention applied to a hydraulic turbine of the propeller or Nagler type to which water flow is delivered through a diagonal or inclined guide case by which the water is given both an axial and a radial component of flow into the turbine; and Fig. 3 is a partial sectional view of a modified form of the invention adapted to provide a bypass for the entire flow through the gate of the turbine and arranged to open completely and immediately upon beginning of full closure of the turbine gate.

Referring more particularly to the drawings by characters of reference, the reference numeral 6 designates a portion of a spiral casing to which water is delivered from the usual penstock (not shown) and which supplies water through a speed ring, formed by the upper and lower portions 7 and 8, to the rotor of the hydraulic turbine. A plurality of vanes 11 are mounted on stems 12 which are rotatably mounted in the speed ring and extend upwardly beyond the speed ring for connection with operating means by which the vanes may be moved to throttle or shut off the flow of water to the turbine. An annular cover plate 13 is secured on the speed ring portion 7 or may be formed as an extension thereof if so desired. The lower speed ring portion 8 is joined with a discharge ring 14 which is preferably connected with a liner 16 for the draft tube of the turbine. The structural portions above identified substantially form a casing into which a shaft 17 extends, which shaft is rotatable in a bearing 18 mounted in the cover plate 13. The shaft supports a hub and disk 21 from which extend vanes 22 having the outer ends thereof joined by a discharge band or shroud 23, all of which portions constitute the turbine rotor or runner. Water flowing from the spiral casing 6 through the speed ring 7, 8 flows through the runner vanes 22 and discharges through the discharge ring 14 into the draft tube 16. Rotary motion imparted to the runner vanes by such water flow is transmitted by the shaft 17 to any suitable driven mechanism which is usually an electric generator.

The flow of water through the speed ring 7, 8 is controlled by the position of the gate vanes 11 which are operable from a shifting ring 26 through suitable links 27 connecting the shifting ring with the gate vane stems 12. The shifting ring is mounted on the cover plate 13 and is preferably operable by servo-motors responsive to the rotor speed as is well known and therefore not shown.

The discharge ring 14 is formed with an annular recess which forms a cylinder 31 in which is mounted a piston 32 having opposing differential surfaces 33 and 34 to which pressure may be applied within the cylinder. It will be understood that the piston 32 is annular to fit in the cylinder 31 and it will be seen that the piston surface 33 is much greater than the surface 34. The walls of the cylinder 31 are parallel with the axis of the shaft 17 and the piston 32 must therefore move in a direction parallel to the axis of the shaft. The runner shroud 23 is formed with a surface 36 at an angle to the axis of the shaft 17 and the surface 37 of the piston 32 is formed at a similar angle to minimize the space between the surfaces 36 and 37 when the piston 32 is raised as will be described. The piston surfaces 33 and 34 are joined by apertures 41 and the cylinder space above the piston surface 34 communicates with the spiral casing 6 by passageways 42 formed in the speed ring portion 8. Water under pressure may thus flow from the spiral casing 6 through the passageways 42 and the apertures 41 below the piston surface 33. Such water may be discharged from below the piston 32 to the tailrace (not shown) by a conduit or conduits 43 controlled by a valve 44 which is operable by suitable means responsive to the position of the gate vanes 11.

As shown in Fig. 1, such valve operating means comprises an electrical solenoid 46, the coil of which is energized from a source of electric current such as the battery 47 upon bridging of the contacts 48. A contact bridging member 51 is pivotally mounted at 52 and is in the form of a bell crank lever. An arm 53 is mounted on a gate vane stem 12 or on the arm 27 thereof and carries a roller 54 preferably adjustably mounted on the arm, which roller engages with the lever 51 upon movement of the gate vanes to thereby close the contacts as will be apparent hereinafter.

When the gate vanes 11 are moved into the position shown to shut off the flow of water into the turbine, the impossibility of completely shutting off such flow (with the present type of vane construction) permits a quantity of water to enter the runner. Such leakage through the gate is undesirable when the turbine is to be at standstill and is particularly objectionable when the turbine is being operated by the generator as a synchronous condenser because of the power loss entailed. The roller 54 is then so adjusted as to engage the lever 51 to cause such lever to bridge the contacts 48. Solenoid 46 is therefore energized and the valve 44 is lifted to discharge the pressure applied to the piston surface 33 through the passageways 42 and the apertures 41. Any pressure previously present under the piston surface 33 is therefore relieved and pressure from the spiral casing, always acting through the passageways 42 on the piston surface 34, aids the weight of the piston in forcing the piston into the position shown. Leakage through the gate 11 then flows through the liberal space between the piston 32 and the discharge band 23 without entering or in any way disturbing the rotation of the turbine runner.

After the gate vanes have been moved into a predetermined open position, the roller 54 leaves the lever 51 and the lever drops. Solenoid 46 is then deenergized and valve 44 closes. Continued supply of water through the passageways 42 and the apertures 41 below the piston surface 33 now builds up pressure and, as soon as the unit pressure under the surface 33 approaches the unit pressure on surface 34, the larger surface 33 overcomes the weight of the piston and the action of the surface 34 thereby causing the piston 32 to lift. Lifting of the piston 32 continues until the piston surface 34 contacts with the speed ring portion 8 whereupon the piston surface 37 is in close proximity to the discharge band surface 36. A slight clearance between the surfaces 36 and 37 is of course necessary but the quantity of water leaking through such clearance space is very much reduced by the provision of circumferential grooves in the discharge band surface and the piston surface 37 which grooves act as seals in the well known manner.

The construction illustrated in Fig. 2 differs from that above described in such structural details as are required by the diagonal speed ring construction as well as by the differences due to the use of the propeller type turbine and due to mechanical operation of the discharge valve. The shifting ring 26 is now preferably mounted on the speed ring as being the most accessible location therefor. The piston 32 is formed somewhat differently from the construction illustrated in Fig. 1 but functions as previously described. Discharge of leakage through the conduit 43 is now however controlled by a valve 71 which is rotated into open and closed position by a direct mechanical connection of the stem of the valve with an extension 72 of the gate vane stem 12 by any suitable means such as the gears 73 and 74. The spiral casing 6 is connected with the smaller surface of piston 32 by a conduit 76 rather than by a passage formed in the speed ring.

The operation of the modified form of the invention is similar to that previously described except that rotation of the gate vanes 11 into the closed position rotates the gear 74 which rotates gear 73 to open the valve 71. Pressure is then discharged through conduit 43 as previously described and the piston 32 drops away from the position shown which allows leakage through the gate to flow through the space between the ends of the rotor vanes 62 and the outer surface of the piston 32. When the gate is open the valve 71 is closed and pressure is built up in the cylinder 31 to act on the piston surface 33 to raise the piston and thereby close off the space between the rotor vane ends and the piston to prevent any leakage therethrough during power producing operation of the turbine. A ring may be removably mounted on the outer surface of piston 32. Such construction permits high finishing of the ring and materially simplifies manufacture of the piston.

In the modified form of the invention illustrated in Fig. 3, the discharge ring 14 is formed with a plurality of apertures 81 through the body of the ring and forming discharge ports from the cylinder 31 formed in the ring. The piston 32 is formed as before with the differential surfaces 33 and 34 and is provided with apertures 82 therethrough which are so located as to shut off apertures 81 when the piston 32 is in its lowermost position shown and to register with apertures 81 when in the raised position of the piston. When the piston 32 is raised, flow of water to the turbine rotor is shut off and all of such flow is bypassed around the turbine rotor through the plurality of passageways formed by the registering ports 81 and 82.

Flow of fluid from the spiral casing 6 to differential piston surface 34 and from such surface to piston surface 33 is controlled by a valve 83 which connects the upper and lower cylinder portions and allows discharge therefrom. The valve 83 is controlled by a floating lever 84 connected with piston 32 and with the differential piston of a servo-motor 86. Fluid pressure applied to servo-motor 86 is controlled by a pilot valve 87 provided with an inlet 88 to the valve, a plurality of ports 91 and 94 and outlets 89, 92 and 93 from the valve. The pilot valve is connected with a suitable pressure source (not shown) by way of inlet 88. The pilot valve also controls the application of fluid to the differential piston of the servo-motor 96 which controls the opening and closing movements of the gate vanes 11. The pilot valve 87 is controlled by the movement of the speed governor 97 by way of a floating lever 98 having one end thereof connected with another floating lever 99. Lever 99 is connected by way of a bell crank 101 with the gate vane shifting mechanism and with a rod 102 connected with the piston of servo-motor 86.

As long as the speed of the turbine remains constant and no change of the gate vane setting is required, the speed governor holds valve 87 in the position shown. Pressure through inlet 88 acts through outlet 89 and port 91 while outlets 92 and 93 and port 94 are shut off. Such pressure acts on the smaller surface of the piston servo-motor 96 and on both surfaces of the piston of servo-motor 86. Servo-motor 96 then holds gate vanes 11 in the position shown and servo-motor 86 is biased upwardly to tend to lift the piston of valve 83 thereby relieving pressure under surface 33 to keep bypass 81, 82 closed thus allowing full passage between gate vanes 11 and runner 22. Water under pressure acting through conduit 76 on surface 34 of piston 32 retains the piston in the position shown. For slight or gradual changes of load, speed and gate vane setting; only the servo-motor 96 is affected while the position of servo-motor 86 remains unchanged.

When a large and sudden speed increase takes place, the piston of pilot valve 87 may be raised to open port 94 to such extent as to connect port 91 with outlet 92. Servo-motor 96 then closes gate vanes 11 and the pressure under the large surface of the piston of servo-motor 86 discharges. The pressure remaining on the smaller surface of the piston of servo-motor 86 depresses the piston and causes valve 83 to connect conduit 76 with larger surface 34 of the piston 32 which is raised to cause registering of port 81 and 82 and to bypass water flowing through the turbine. When the speed again approaches normal, the piston of the pilot valve 87 returns to the position shown which causes servo-motor 96 to return to the position shown. Servo-motor 86 then lifts the piston of valve 83 to allow discharge from beneath surface 33 of piston 32 and the piston returns to the position shown.

The present invention therefore provides a construction for bypassing undesired and unavoidable gate leakage from a hydraulic turbine or to bypass all of the water around the turbine runner without in any way affecting the movement of the runner and by means which minimize the non-power producing leakage of water through the turbine during power producing operation thereof. Such means provide a relatively quick acting control of the path of water flow through the turbine and such path is controlled responsive to operation of the turbine gate beyond a predetermined point. The flow path controlling means are operable solely by the penstock pressure and therefore do not require the provision of an auxiliary source of power for the operation thereof.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In a hydraulic turbine construction, a source of water under pressure, a rotor operable upon supply of water thereto from said source, a gate operable to control the supply of water from said source to said rotor and arranged to substantially shut off the flow of water thereto, a member movable into and out of cooperative relation with said rotor to provide a by-pass around said rotor for flow of water therethrough, and hydraulic means controlled by movement of said gate to cause movement of said member.

2. In a hydraulic turbine construction, a source of water under pressure, a rotor operable upon supply of water thereto from said source, a gate operable to control the supply of water from said source to said rotor and arranged to substantially shut off the flow of water thereto, a member movable into and out of cooperative relation with said rotor to provide a by-pass around said rotor for flow of water therethrough, and hydraulic means connected with said source and controlled by movement of said gate to cause movement of said member.

3. In a hydraulic turbine construction, a source of water under pressure, a rotor operable upon supply of water thereto from said source, a gate operable to control the supply of water from said source to said rotor and arranged to substantially shut off the flow of water thereto, and a member having apertures therethrough and movably arranged in the space between said rotor and said gate to bypass flow of water around said rotor, and hydraulic means connected with said source and controlled by movement of said gate to cause opening of the apertures through said member to bypass flow of water around said rotor.

4. In a hydraulic turbine construction, a source of water under pressure, a rotor operable upon supply of water thereto from said source, a gate operable to control the supply of water from said source to said rotor and arranged to substantially shut off the flow of water thereto, and a substantially cylindrical member having apertures therethrough and movable into position between said rotor and said gate to direct the flow of water through said gate entirely around and without contacting said rotor.

5. In a hydraulic turbine construction, a source of water under pressure, a rotor operable upon supply of water thereto from said source, a gate operable to control the supply of water from said source to said rotor and arranged to substantially shut off the flow of water thereto, and a member movable into and out of proximity with said rotor to bypass leakage through said gate around and without contacting said rotor upon movement of said member away from said rotor.

6. In a hydraulic turbine construction, a source of water under pressure, a rotor operable upon supply of water thereto from said source, a gate operable to control the supply of water from said source to said rotor and arranged to substantially shut off the flow of water thereto, a member movable into and out of proximity with said rotor to bypass leakage through said gate around and without contacting said rotor upon movement of said member away from said rotor, and means for controlling the movement of said member.

7. In a hydraulic turbine construction, a source of water under pressure, a rotor operable upon supply of water thereto from said source, a gate operable to control the supply of water from said source to said rotor and arranged to substantially shut off the flow of water thereto, a member movable into and out of proximity with said rotor to bypass leakage through said gate around and without contacting said rotor upon movement of said member away from said rotor, and means for controlling the movement of said member responsive to movement of said gate.

8. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, and means for controlling the action of the pressure in response to movement of said gate.

9. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, and means connected with said gate and operable after a predetermined movement thereof to control the application of pressure to said piston.

10. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, passageways connecting the surfaces of said piston with said source beyond said gate, and means connected with said gate and operable after a predetermined movement thereof to control the application of pressure through said passageways to said piston.

11. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, passageways connecting the surfaces of said piston with said source beyond said gate, a valve controlled by said gate to control the application of pressure to said piston through said passageways after a predetermined movement of said gate.

12. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, passageways connecting the surfaces of said piston with said source beyond said gate, a valve controlling the discharge of pressure from said piston, and means for opening said valve upon closure of said gate beyond a predetermined point.

13. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, passageways connecting the surfaces of said piston with said source beyond said gate, a valve controlling the discharge of pressure from said piston, and electrical means for opening said valve upon closure of said gate beyond a predetermined point.

14. In a hydraulic turbine construction, a source of water under pressure, a rotor operable upon supply of water thereto from said source, a gate operable to control the supply of water from said source to said rotor and arranged to substantially shut off the flow of water thereto, a differential piston arranged for movement into and out of proximity with said rotor to provide and to close off a passage for leakage through said gate without contacting with said rotor, said piston being operable by pressure from said source, passageways connecting the surfaces of said piston with said source beyond said gate, a valve controlling the discharge of pressure from said piston, and mechanical means for opening said valve upon closure of said gate beyond a predetermined point.

ARNOLD PFAU.